(No Model.)
C. ROBERTS, Dec'd.
J. B. & G. A. ROBERTS, C. B. TUCKER & S. H. ROBERTS, Executors.
HAND CAR.
No. 514,729. Patented Feb. 13, 1894.
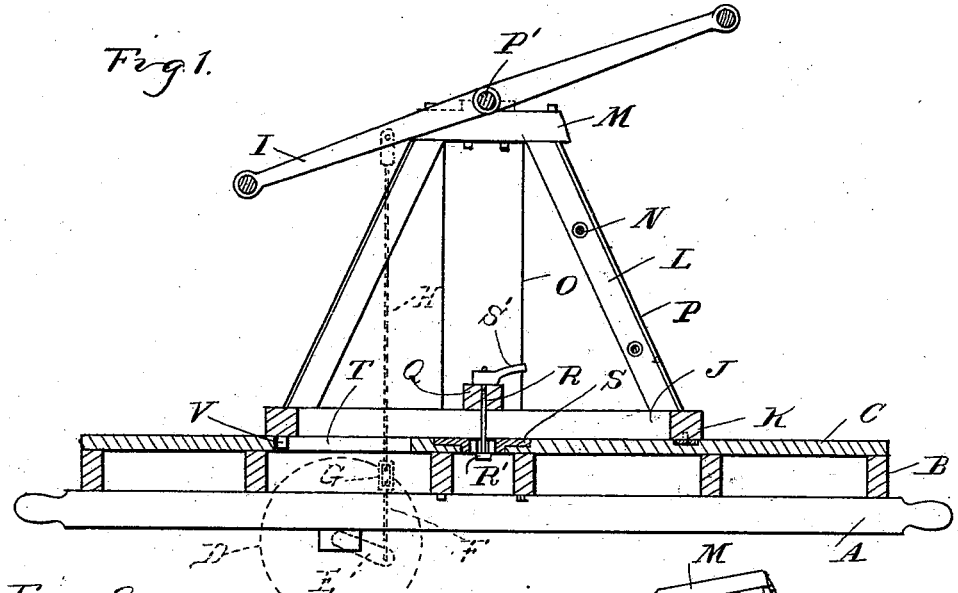
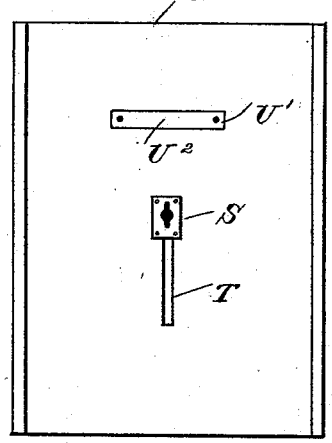
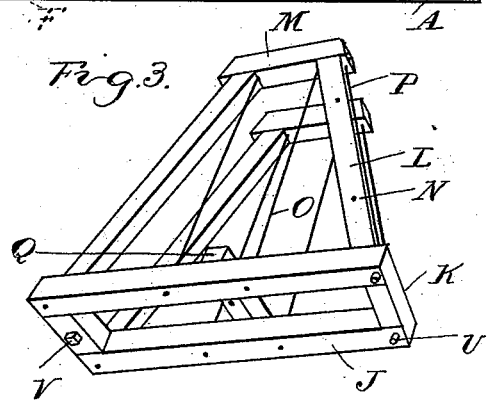
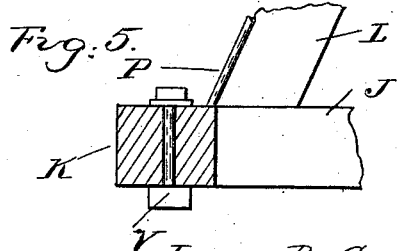
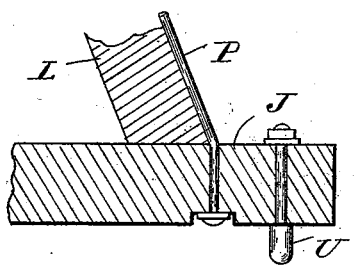
James B., George A., Samuel H. Roberts
and Carrie B. Tucker, executors of
Cyrus Roberts, Inventor,
By Thos. S. Sprague & Son Atty's.
Witnesses
A. L. Hobbie
M. B. O'Dogherty

UNITED STATES PATENT OFFICE.

JAMES B. ROBERTS, GEORGE A. ROBERTS, AND CARRIE B. TUCKER, OF THREE RIVERS, MICHIGAN, AND SAMUEL H. ROBERTS, OF DENVER, COLORADO, EXECUTORS OF CYRUS ROBERTS, DECEASED.

HAND-CAR.

SPECIFICATION forming part of Letters Patent No. 514,729, dated February 13, 1894.

Application filed October 17, 1893. Serial No. 488,423. (No model.)

*To all whom it may concern:*

Be it known that CYRUS ROBERTS, a citizen of the United States, residing at Three Rivers, in the county of St. Joseph and State of Michigan, having invented certain new and useful Improvements in Hand-Cars, and being now deceased, we, JAMES B. ROBERTS, GEORGE A. ROBERTS, and CARRIE B. TUCKER, of Three Rivers, St. Joseph county, Michigan, and SAMUEL H. ROBERTS, of Denver, Arapahoe county, State of Colorado, the executors of the last will and testament of said CYRUS ROBERTS, deceased, do hereby present the following specification of said invention, reference being had to the accompanying drawings.

The invention consists in the peculiar construction of the gallows frame, and in the construction of the connecting devices between the gallows frame and platform, whereby the frame may be quickly detached and leave the platform clear for use as a push car, all as more fully hereinafter described.

In the drawings, Figure 1 is a vertical, longitudinal section through a hand car embodying the improved construction. Fig. 2 is a plan view of the platform, the gallows frame being detached. Fig. 3 is a detached perspective view of the gallows frame. Figs. 4 and 5 are enlarged vertical sections through the ends of the gallows frame illustrating the securing devices therefor.

A, B are the longitudinal and cross-timbers and C the covering for the car platform.

D is the driving gear meshing with a pinion on the axle, not shown. E is the actuating crank therefor. F the lower section of the pitman.

G is a turnbuckle, detachably connecting the section F of the pitman with the section H, thereof, which connects with the walking beam I, which is journaled in bearings at the top of the gallows frame.

In the use of hand cars, it frequently happens that a push or rubble car is desired when no such car is available. This construction is designed to produce a car which may be used either as a hand car or a push car and accomplishes the result through a detachable gallows frame, the two part pitman permitting the actuating mechanism above the car to be removed, leaving no part projecting above the same.

In the ordinary car, the gallows frame is framed into the platform, and the central portion of the platform within the gallows frame is cut out or left open, thus making it impossible to detach the gallows frame, and still permit of the use of the car for push car purposes. In this construction the gallows frame is made an independent structure and consists of the platform-sills J connected together at the ends by connecting bars K, the inclined posts L and caps M at the top thereof. The posts are tied together by suitable tie rods N and the cap and sill are tied together by the vertical tie rods O, and the inclined tie rods P, which pass through the projecting ends of the cap and sills and are tightened by suitable nuts. The gallows frame is provided at the top with suitable journals for the shaft P' of the walking beam I.

Q is a central cross-bar between the sills of the gallows frame and this is provided with a clamping bolt R passing therethrough and provided with a T-shaped head R'. This head is adapted to engage through a corresponding aperture in the plate S in the platform and then in turning a half turn will be locked therethrough and the gallows frame may be clamped upon the platform by the clamping nut S' which is provided with a suitable hand lever. The connecting rod works through a longitudinal slot T. To prevent the gallows frame from twisting or sliding, it is provided at one end with the pins U which are adapted to enter apertures U' in the plate U$^2$ and at the other end with a block V which is adapted to enter one end of the slot T for the walking beam. Thus when the gallows frame is clamped in position the clamping bolt will hold it upon the platform and the pins U and block V will prevent it twisting or slipping. To detach it the operator has simply to remove the turnbuckle in the connecting rod H, loosen the nut R', turn the bolt R a half turn and the gallows frame may then readily be detached. When the parts are thus separated the platform will present the appearance shown in Fig. 2, the only apertures being the apertures of the clamping bolt and the slot for the connecting rod and will not interfere with the use of the car for push car or rubble purposes.

What is claimed as the invention is—

1. In a hand car, the combination with a platform having recesses therein, of a removable gallows frame having fixed projections on its base adapted to rest in the recesses, a central cross-bar, a key bolt passing through the bar, and a locking plate on the car through which the key passes and is adapted to engage when turned, substantially as described.

2. In a hand car, the combination with a platform, of a gallows frame mounted thereon, interlocking means between the frame and platform for preventing a horizontal movement of the frame, a plate on the car and a rotary key bolt on the gallows frame having a T-head adapted to engage said plate and lock the frame against vertical movement, substantially as described.

3. In a hand car, the combination of a car platform having sockets, a detachable gallows frame having pins at the ends adapted to fit said sockets, and a central adjustable clamping bolt on the gallows frame adapted to engage a bearing in the platform to clamp said frame to the platform, substantially as described.

4. In a hand car, a gallows frame, comprising platform-sills, capped inclined posts and tie rods extending through the caps and sills beside and parallel with the inclines, substantially as described.

5. In a hand car, the combination with a platform having sockets therein, of a detachable gallows frame having pins at its ends fitted in said sockets, a bearing plate on the platform, and an adjustable clamping bolt or key on the gallows frame arranged to engage the bearing plate when turned, substantially as described.

6. In a hand car, the combination with a platform having depressions at one end, a longitudinal slot in the platform, a crank, a detachable gallows frame having projections adapted to engage the apertures and slot in the platform, a walking beam on the gallows frame, a connecting rod between the walking beam and crank passing through the slot, an apertured plate on the platform, and a key on the gallows frame adapted to engage the aperture in the plate, substantially as described.

In testimony whereof we affix our signatures in presence of witnesses.

JAMES B. ROBERTS,
GEORGE A. ROBERTS,
CARRIE B. TUCKER,
SAMUEL H. ROBERTS,
*Executors of the estate of Cyrus Roberts.*

Witnesses to signatures of James B. and George A. Roberts, and Carrie B. Tucker:
MARVIN H. BUMPHREY,
JAMES E. BUNN.

Witnesses to signature of S. H. Roberts:
JAS. F. CARROLL,
GEO. H. KNIFTON.